May 20, 1952     C. HUSSMAN     2,597,244
VIBRATION ISOLATING SUPPORT
Filed April 7, 1949
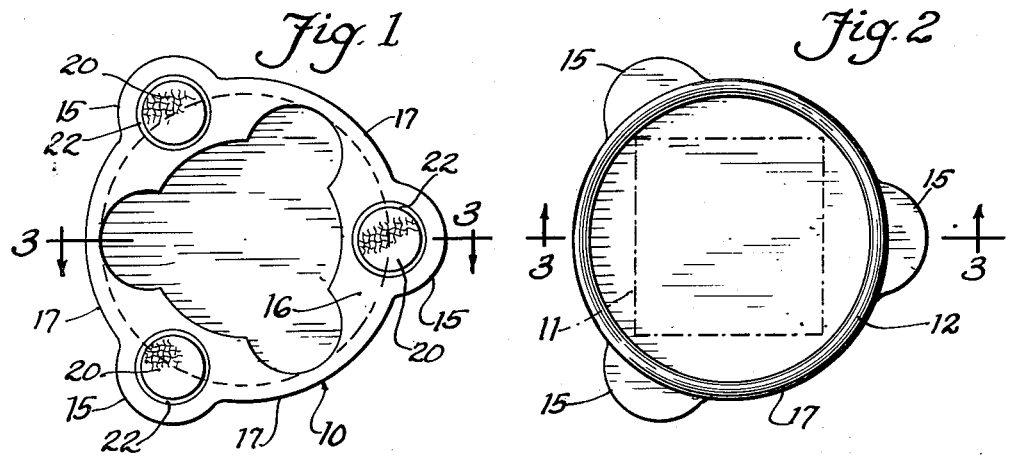
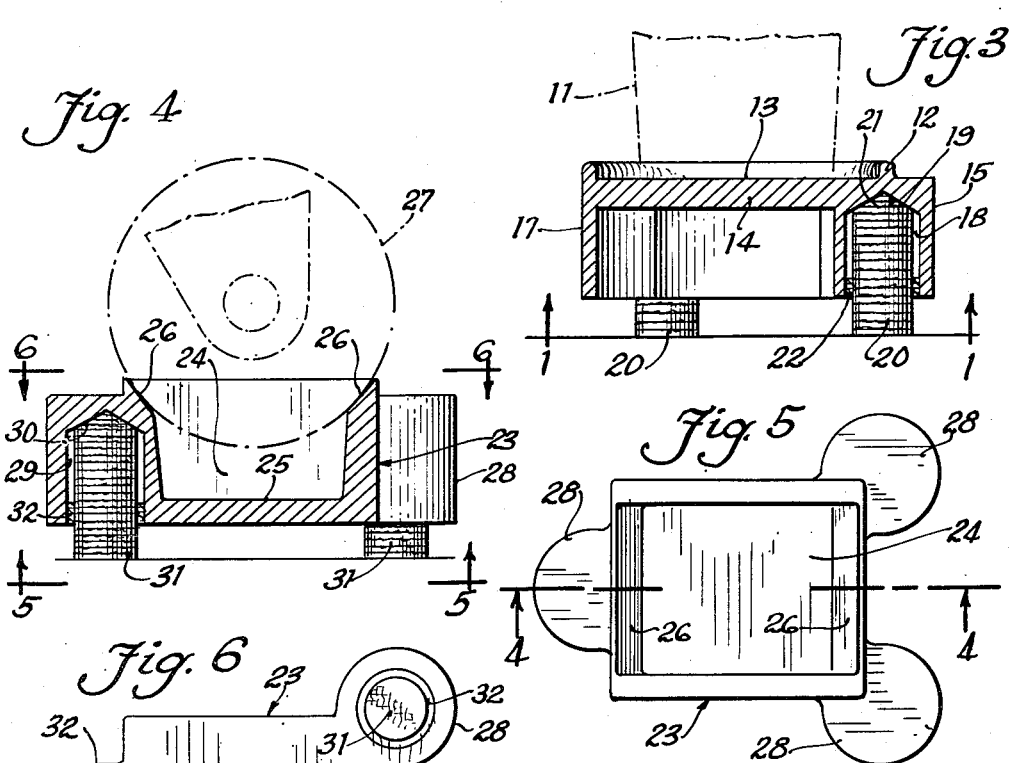
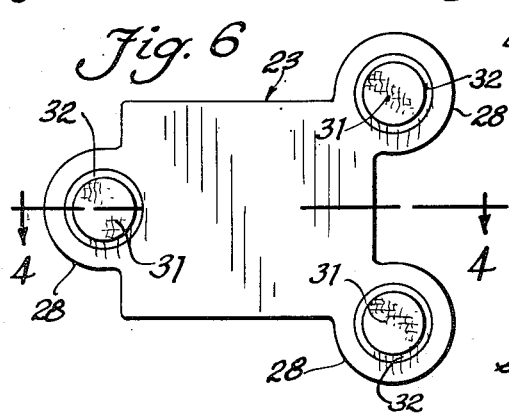
INVENTOR.
Carl Hussman
BY
Sheridan, Davis & Cargill
Att'ys

UNITED STATES PATENT OFFICE 2,597,244

VIBRATION ISOLATING SUPPORT

Carl Hussman, Chicago, Ill.

Application April 7, 1949, Serial No. 86,073

2 Claims. (Cl. 248—22)

This invention relates to improvements in vibration isolating supports.

Vibrations that originate in some office machines often are a source of annoyance to the occupants of the office, as well as to the occupants of space above and below that in which such machines are located. This is particularly true of certain commonly used business machines which often weigh up to fifteen hundred or two thousand pounds, since the vibrations generated by such machines frequently are transmitted directly to the floor on which the machines stand, and thence by the building structure to the offices in adjacent parts of the building. Such heavy machines also not infrequently damage the floors or floor coverings in instances where they are permitted to rest directly thereon.

It is an object of the present invention to provide improved machine-supporting vibration isolating units that prevent or materially reduce the transmission of annoying vibrations to the floor on which the machines are supported, and from which they frequently are transmitted in annoying volume to other portions of the building. The improved units hereinafter described and shown in the accompanying drawings are designed for use under the legs of the offending machines, such legs generally being of metal, and in some instances being provided with casters. The units provide suitable recesses for receiving the various styles and shapes of the lower ends of the legs commonly used, but the vibration isolating structures of the several units are similar and are designed to accommodate the use of deflectable or vibration damping elements which provide the optimum in vibration isolating results in particular instances of use. For example, two machines differing substantially in weight and in operating characteristics might well require, for effective isolation of the objectionable vibrations generated by them, isolating units having vibration damping elements of different characteristics for giving maximum efficiency under the respective loads imposed by the machines. Likewise, a single machine may impose far greater weight on one leg than on the others, and in such instances the improved units employed with such a machine, while in appearance identical, can be provided with vibration damping elements that provide substantial equal isolating results while supporting the machine in a desired level condition.

Other objects and advantages of the improvements will be apparent from a consideration of the following specification and accompanying drawings wherein:

Figure 1 is a bottom plan view of a form of vibration isolating unit that is illustrative of the present invention;

Fig. 2 is a top plan view of the unit shown in Fig. 1;

Fig. 3 is a sectional view taken on line 3—3 of Fig. 2;

Fig. 4 is a sectional view of a second form of the improved unit, the section being taken on line 4—4 of Fig. 5;

Fig. 5 is a top plan view of the unit shown in Fig. 4; and

Fig. 6 is a bottom plan view of said unit.

The unit shown in Figs. 1 to 3, inclusive, comprises a suitable base 10 for receiving the bottom end of a leg of a machine to be supported, and the vibrations generated by which are to be isolated against transmission in disturbing values to the supporting floor. All the legs of the machine will, of course, be provided with similar units. In Figs. 2 and 3 a conventional machine leg is indicated in broken lines and designated by numeral 11. The upper surface of the base 10 is provided with a perimetrical flange or rim 12 which in effect provides a recess for retaining the bottom end of the leg against displacement from the supporting surface 13 of a horizontal web or wall 14 of the unit. The member 10 preferably is of metal such as cast aluminum or brass, for example, and is provided with three columns or lobes 15 that are shown spaced 120° of arc apart. The lobes 15 are integral with solid segmental portions 16 of the base member, the central portion beneath the web or wall 14 being made hollow for reducing the amount of material required in casting the base. The base, as shown, is provided with an exterior side wall 17 that is generally cylindrical in appearance, and from which the lobes 15 extend. Cylindrical cells or recesses 18 are provided in the three portions of the base formed by the lobe 15 and the contiguous portions 16. These cells preferably are formed by drilling from the lower surface of the base, the upper ends of the cells being defined by conical walls 19. Vibration isolating or damping elements are adapted for insertion in the cells, the elements being indicated by numeral 20.

The elements 20 in the form shown are of a laminated structure comprising superposed layers of fabric impregnated or coated with rubber or other resilient material, and bonded together as by vulcanization. The individual elements 20 may be cut from a pre-formed sheet or slab of the laminated material. Each element 20 is provided with a conical upper end 21 and is seated in a cell 18 with the conical end in contact with the conical wall 19, which provides a centering seat for the upper end of the element. The elements are shown as having cylindrical side walls, and are of a diameter less than the diameter of the cells, and hence provide annular spaces between the cell walls and the respective elements for purposes hereinafter mentioned. The lower portions of the elements are retained in axial alignment within the cells by means which afford adequate centering and stablizing action for the lower portions of the elements, such as rings 22 which may be of the same laminated compressible material as that of which the elements are formed.

The elements 20 are of sufficient length to support the bases above and out of contact with a floor, the three-element units each providing three points of support for each leg of the machine. The elements of the character mentioned are longitudinally compressible under the loads imposed upon them by the supported machine. The extent of longitudinal compression or deflection of the elements under the supported loads should always be less than the elastic limits of the material, but short of that limit, the greater the compression, the greater is the vibration isolating value of the elements. Where the elements are made of a material such as the laminated material above mentioned, having uniform compression characteristics, elements of selected diameter can be employed in a given installation that affords a satisfactory degree of compression under the load imposed by the particular supported machine. Where the weight of the machine is equally distributed on all supporting legs, the elements of each unit should be equal in compressive resistance, but in instances where one leg of the machine carries a greater portion of the total weight of the machine than the other legs, the isolating unit bearing the greater weight can be provided with elements of sufficiently greater diameter than the elements of the other units for giving equivalent vibration isolating effects and for maintaining the machine at a proper operating level.

It will be seen that similar bases may be used with satisfactory results on different machines that vary quite materially in weight by providing elements 20 of appropriate cross-sectional area, formed of the same material or of different compressible resilient material, which, under the conditions of use provide satisfactory vibration isolating results.

The cells of a unit are of greater diameter than the normal diameter of the elements to be used in the cells, and also are of greater diameter than the diameter of the elements when the latter have been longitudinally foreshortened and radially expanded by the weight of the supported machines, whereby actual contact of the walls of the cells with the cylindrical side walls of the elements is avoided, since such contact would result in a shortened path for transmission of vibrations from the base to the floor. The rings 22 being under some radial compression by the pressed fit within the annular spaces surrounding the elements, and being further compressed when the elements are radially expanded by the loads, perform a vibration isolating function between the cell walls and the respective elements, in addition to cooperating with the conical formations of the upper ends of the elements and the respective conical seats 19 in centering the elements within the cells.

The unit shown in Figs. 4 to 6, inclusive, comprises a base 23 which is rectangular in plan view and is provided with a rectangular-shaped recess 24 for receiving a leg of a machine, which may rest upon a bottom 25 that is closer to the floor than is the wall 13 of the above-described units. Opposed upper edges 26 of two of the walls defining the recess 24 are shown as beveled inwardly to provide supporting surfaces upon which a caster 27 of a machine leg may rest, where the caster is of a diameter that precludes its seating upon the floor or bottom wall 25.

The base 23 is provided, in the form illustrated, with three vertical bosses or lobes 28 which are vertically drilled from the lower side of the base to provide cells 29 having upper conical seats 30 for receiving vibration damping elements 31, which are similar to the elements 20 of the unit described above. Centering and retaining members 32 of annular form similar to the elements 22 are provided, as shown in Figs. 4 and 6. Since the vibration isolating characteristics of the structure shown in Figs. 4 to 6 are similar to those of the above described unit, further description of the modification is believed unnecessary.

While I have shown and described vibration isolating units that are illustrative of my improvements, are neat in appearance, simple in design and economical to manufacture, it will be apparent that various changes may be made in the units within the spirit of the invention defined by the appended claims.

I claim:

1. A vibration isolating support for use under a leg of a vibration generating machine comprising a base upon which the leg is adapted to rest, said base being provided with vertically arranged cells open at the lower side of the base and provided with upper conical walls, a resilient compressible vibration damping element in each cell provided with a conical upper end seating against the conical wall of the respective cell and extending beyond the lower ends of the cells a distance greater than the foreshortening of the element caused by the imposed load for supporting said base above the floor, said elements being of less diameter than said cells and being spaced from the vertical walls of the latter, and ring-shaped members disposed between the elements and the lower portions of the respective cell walls for retaining the elements out of contact with the walls of the cells.

2. A vibration isolating support for use under a leg of a vibration generating machine comprising a base upon which the leg is adapted to rest, said base being provided with a plurality of vertical cells of cylindrical form provided with conical walls at the upper ends and being open at the bottom of the base, a generally cylindrically-shaped vibration damping element in each cell of less diameter than the cell and provided with a conical upper end seating against said conical wall of the cell for centering the upper end of the element with respect to the cell, an annular member of vibration damping material surrounding each element and contacting the adjacent side wall of the cell adjacent the lower end of the latter for centering the lower portion of the element within the cell and resisting displacement of the element from said centered position, said elements being of material compressible under the imposed loads and extending from the cells a distance greater than the extent of foreshortening thereof caused by the imposed load for supporting the base above a floor.

CARL HUSSMAN.

REFERENCES CITED

The following references are of record in the file of this patent:

UNITED STATES PATENTS

| Number | Name | Date |
|---|---|---|
| 878,043 | Chrisman | Feb. 4, 1908 |
| 1,870,310 | French | Aug. 9, 1932 |
| 2,118,068 | Buckley | May 24, 1938 |
| 2,379,763 | Sweet et al. | July 3, 1945 |

FOREIGN PATENTS

| Number | Country | Date |
|---|---|---|
| 797,652 | France | May 1, 1936 |